United States Patent [19]
Arya

[11] Patent Number: 5,924,125
[45] Date of Patent: *Jul. 13, 1999

[54] METHOD AND APPARATUS FOR PARALLEL ACCESS TO CONSECUTIVE TLB ENTRIES

[76] Inventor: Siamak Arya, 398 Creekside Dr., Palo Alto, Calif. 94306

[*] Notice: This patent issued on a continued prosecution application filed under 37 CFR 1.53(d), and is subject to the twenty year patent term provisions of 35 U.S.C. 154(a)(2).

[21] Appl. No.: 08/520,973

[22] Filed: Aug. 1, 1995

[51] Int. Cl.[6] ................................................ G06F 12/08
[52] U.S. Cl. .................. 711/205; 711/131; 365/230.06
[58] Field of Search .................................. 395/416, 417; 365/230.06; 711/205, 206, 207, 211, 213, 131

[56] References Cited

U.S. PATENT DOCUMENTS

| | | |
|---|---|---|
| 4,646,271 | 2/1987 | Uchiyama et al. . |
| 4,758,951 | 7/1988 | Sznyter, III . |
| 4,980,816 | 12/1990 | Fukuzawa et al. . |
| 4,982,402 | 1/1991 | Beaven et al. . |
| 5,027,270 | 6/1991 | Riordan et al. . |
| 5,148,536 | 9/1992 | Witek et al. . |
| 5,193,181 | 3/1993 | Barlow et al. . |
| 5,197,133 | 3/1993 | Shen et al. . |
| 5,197,139 | 3/1993 | Emma et al. . |
| 5,226,133 | 7/1993 | Taylor et al. . |
| 5,247,629 | 9/1993 | Casamatta et al. . |
| 5,293,612 | 3/1994 | Shingai . |
| 5,299,147 | 3/1994 | Holst . |
| 5,305,444 | 4/1994 | Becker et al. . |
| 5,307,506 | 4/1994 | Colwell et al. . |
| 5,319,760 | 6/1994 | Mason et al. . |
| 5,386,530 | 1/1995 | Hattori et al. . |
| 5,404,476 | 4/1995 | Kadaira . |
| 5,404,478 | 4/1995 | Arai et al. . |
| 5,412,787 | 5/1995 | Forsyth et al. . |
| 5,463,750 | 10/1995 | Sachs . |
| 5,502,829 | 3/1996 | Sachs ...................................... 395/417 |

OTHER PUBLICATIONS

Takayanagi, et al., "2.6 Gbyte/sec Bandwidth Cache/TLB Macro for High–Performance RISC Processor," *IEEE 1991 Custom Integrated Circuits Conf.*, pp. 10.2.1–10.2.4.

Tamura, et al., "A 4–ns BiCMOS Translation–Lookaside Buffer," *IEEE J. of Solid State Circuits*, vol. 25 No. 5, pp. 1093–1101, Oct. 1990.

*Primary Examiner*—Eddie P. Chan
*Assistant Examiner*—Kevin Verbrugge
*Attorney, Agent, or Firm*—Townsend & Townsend & Crew LLP

[57] ABSTRACT

Apparatus and method for enabling substantially simultaneous access to consecutive entries in an addressable translation memory. The addressable translation memory may be either direct mapped or multi-way set associative. An address decoder receives input address signals and generates output select signals. Each input address signal and each output select signal corresponds to one of the registers in the translation memory. The invention includes a plurality of primary select lines, each of which transmits one of the output select signals to its corresponding register. The invention also includes a plurality of secondary select lines, each of which transmits an output select signal corresponding to a particular register to a second register, the particular register and the second register storing consecutive entries in the translation memory. The particular register and the second register receive the output select signal substantially simultaneously.

10 Claims, 5 Drawing Sheets

METHOD AND APPARATUS FOR PARALLEL ACCESS TO CONSECUTIVE TLB ENTRIES

BACKGROUND OF THE INVENTION

The present invention relates generally to a method and apparatus for reading data from a translation lookaside buffer (TLB). More specifically, the present invention allows two consecutive TLB entries to be accessed in parallel.

Many modern computing systems operate on large uniform virtual address spaces that greatly exceed the amount of physical memory actually present in any given machine configuration. For example, 32-bit byte-addressed CPU's generally have a uniform virtual address space of $2^{32}$ bytes or 4 gigabytes per process. However, the amount of physical memory supported by such machines typically ranges anywhere from 1 to 1024 megabytes shared by all processes. Consequently, each memory access requires that the virtual address supplied by the CPU be translated (mapped) into a physical (or real) address that references an actual location in memory. Since the translation process is both relatively lengthy (it consumes many CPU cycles), and since the same address will often be used many times, it is common practice to store mapped pairs of virtual and real addresses in a special cache memory called a translation memory or a translation lookaside buffer (TLB). Virtual addresses supplied by the CPU are checked against the TLB to see if a virtual/real address translation is already stored in the TLB for a given virtual address. If so, then the translation information is obtained directly from the TLB, and the usual translation process is avoided.

FIG. 1 shows a known apparatus 10 for translating 32-bit virtual addresses to 32-bit physical byte addresses. Apparatus 10 includes a register file 14 which, in the apparatus shown, is a 32-bit wide register file. One or more registers 16 within register file 14 (referred to in a memory reference instruction) may store a base address value used in a virtual address calculation. The base address is communicated to an adder 18 over a communication path 22. Adder 18 also receives a displacement address (from the memory reference instruction) over a communication path 26. Adder 18 adds the displacement address to the base address to produce the 32-bit virtual address on a communication path 30.

The 32-bit virtual address output on communication path 30 conceptually may be split into three parts (box 32). First, assume the computing system's physical memory is divided into fixed length pages of $2^{12}$ or 4 kilobytes (KB) each. Thus, for a 4 KB page, 12 bits are needed to address a specific byte in a page. The least significant bits of the virtual address (bits [11:0] in this example) appearing on a communication path 31 may constitute the page displacement portion of the address. These bits need no translation, as they are the same in both the virtual and the real address (VA=RA). Consequently, they may be ignored during the translation process. The middle bits of the virtual address appearing on a communication path 38 (termed the virtual page address) are used to select an entry 40 in TLB 34. The number of bits comprising the virtual page address is a function of the number of entries in TLB 34. For a 64 entry TLB, 6 bits are needed to select one of the entries. Thus, in this case, bits [17:12] are used to address TLB 34. Of course, if TLB 34 contained 128 entries, then TLB 34 would be addressed by 7 bits, and so on. The remaining high order bits (bits [31:18], termed the virtual segment address) are used in the address translation process in the manner discussed below.

Each TLB entry 40 includes a virtual address tag field 42, a real address field 46, and a control field 50. The virtual address tag field 42 typically comprises bits [31:18] of the virtual address corresponding to real address bits [31:12] stored in real address field 46. Control field 50 typically includes access control bits, valid bits, used bits, etc. When TLB 34 is addressed by bits [17:12] of the virtual address on communication path 38, the addressed virtual address tag is communicated to a comparator 54 over a communication path 58. At the same time, bits [31:18] of the virtual address are communicated to comparator 54 over a communication path 62. If the bits match, then a TLB hit signal is provided on a communication path 66. On the other hand, if the bits do not match, then comparator 54 generates a miss signal on communication path 66. If a hit signal is generated on communication path 66, then the addressed entry in TLB 34 contains the address translation information for the requested virtual address, and the real address bits [31:12] in real address field 46 are output on a communication path 70 and concatenated with the VA=RA low order bits of the virtual address (i.e., bits [11:0]) by a real address circuit 71 to form the 32 bit real address RA [31:0] on a communication path 78. The real address then may be used to access the memory.

If a miss signal is generated by comparator 54 on communication path 66, then the virtual address is communicated to a dynamic translation unit (DTU) 82 over a communication path 86 to begin the much slower process of translating the virtual address by accessing page tables stored in main memory. When this "dynamic" translation is completed, TLB 34 will be updated with the newly translated virtual/physical address pair (displacing one of the current entries, if necessary), for a quick reference via TLB lookup should it be used again.

While a TLB lookup (unlike the many-cycle translation process itself) provides a relatively quick way to get a particular virtual-to-physical address mapping, nevertheless, as processor clock speeds increase past 100 MHz, the time needed to access the TLB itself becomes part of the critical path in the machine's operation. Since the TLB is on the critical path for all memory accesses (supplying both source addresses for data or instructions to be loaded from, and destination addresses for data to be stored at), the rate at which the TLB runs ultimately affects the rate at which the entire machine can run.

From inspection of FIG. 1, it should be apparent that a major slowdown in accessing TLB 34 is the 32-bit add that must be performed by adder 18 on the register plus displacement values contained in the memory reference instruction to generate the full 32-bit virtual address. Even using advanced CMOS circuitry, performing a 32-bit add takes considerable time, and access to TLB 34 cannot even begin until the addition is completed. Thus, improvements in the mechanisms for obtaining data from TLB 34 are highly desirable.

One solution to this problem is described in commonly assigned, copendinq U.S. patent application Ser. No. 08/148, 219, now U.S. Pat. No. 5,502,829, filed on Nov. 3, 1993, for APPARATUS FOR OBTAINING DATA FROM A TRANSLATION MEMORY, the entire specification and claims of which are incorporated herein by reference. FIG. 2 is a block diagram of an apparatus 100 according to that application for obtaining data from a translation memory. Some of the components used in apparatus 10 of FIG. 1 are also used in apparatus 100, and their numbering remains the same.

Assume apparatus 100 operates in a computing system which organizes data in 4 KB pages and that TLB 34 contains 64 entries much like apparatus 10 of FIG. 1. In apparatus 100, the displacement address is limited to be no larger than VA=RA page displacement portion of the virtual address (however many bits that may be). Thus, for 4 KB pages, the displacement address is no larger than 12 bits. An adder 110 adds the displacement address received over communication path 26 to the base address received over communication path 22 and provides the 32 bit virtual address on a communication path 30 much like adder 18 of FIG. 1. In addition to the calculated virtual address, adder 110 generates a carry signal on a communication path 114 for indicating whether the addition of the displacement address to the base address resulted in a carry. Unlike apparatus 10 shown in FIG. 1, bits [17:12] of the calculated virtual address are not used to access TLB 34. Instead, bits [17:12] of the base address (termed the base page address) are communicated to TLB 34 over a communication path 118 for directly addressing one of the translation entries 40A therein. Bits [17:12] of the base address are also communicated to an adder 122 which increments the address value by 1 and uses the resulting value to address a second entry 40B within TLB 34. That is, the entry in TLB 34 addressed by bits [17:12] of the base address is accessed along with the next succeeding entry in TLB 34, the access to which is delayed only by the single increment add in adder 122. The virtual address tag 42A and real address tag 46A addressed by the value on communication path 118 together with the virtual address tag 42B and real address tag 46B addressed by the output of adder 122 are communicated to a multiplexer 130 over respective communication paths 131, 132, 133, and 134.

Since the displacement address is no larger than the lower VA=RA page displacement portion of the virtual address, adding the displacement address to the base address at most results in a carry in the bit [12] position. Consequently, the effect of the addition will be at most to increase the value of bits [17:12] of the base address by one. Thus, by accessing TLB 34 with bits [17:12] of the base address and accessing the next succeeding entry in TLB 34 ensures that one of the entries output by TLB 34 corresponds to the entry that would have been requested had TLB 34 been accessed with bits [17:12] of the calculated virtual address. The carry indicating signal on communication path 114 thus may be communicated to multiplexer 130 and used to select the proper translation entry, and the virtual address tag portion of the selected entry is communicated to comparator 54. As in apparatus 10 of FIG. 1, if the selected virtual address tag matches bits [31:18] of the calculated virtual address, then comparator 54 generates a hit signal on communication path 66, and the value in the real address field of the selected entry is concatenated with the VA=RA low order bits of the calculated virtual address by real address circuit 71 to form the 32-bit real address on communication path 78. If the selected virtual address tag does not match, then comparator 54 generates a miss signal, and bits [31:12] of the calculated virtual address are communicated to DTU 82 for translation to a real address.

Since the additional steps required by apparatus 100, i.e., selecting two entries in the TLB and selecting the correct one after the carry on bit [11] is decided, are overlapped with the 32-bit addition of the base plus displacement values, they effectively take no additional time. Since selection of an entry in TLB 34 is completed by the time the add is completed (rather than merely beginning TLB access at that time), the overall result is a significant reduction in the total amount of time occupied by a TLB lookup.

Unfortunately, as processor clock speeds continue to increase, even the simple addition performed by adder 122 can become a bottleneck. Finding the nth+1 TLB entry by adding an offset of 1 to the nth address, while a straightforward and feasible solution to the problem, may present a problem in high speed systems where the addition must propagate through a large number of bits. Therefore, a mechanism is desirable which facilitates access to consecutive TLB entries as closely to simultaneous as possible.

SUMMARY OF THE INVENTION

According to the present invention, an apparatus and method are described for enabling substantially simultaneous access to consecutive entries in an addressable translation memory. As will be discussed, the addressable translation memory may be either direct mapped or multi-way set associative. An address decoder receives input address signals and generates output select signals. Each input address signal and each output select signal corresponds to one of the registers in the translation memory. The invention includes a plurality of primary select lines, each of which transmits one of the output select signals to its corresponding register. The invention also includes a plurality of secondary select lines, each of which transmits an output select signal corresponding to a particular register to a second register, the particular register and the second register storing consecutive entries in the translation memory. The particular register and the second register receive the output select signal substantially simultaneously. Separate output bit lines are also provided so that the two consecutive entries may also be output substantially simultaneously.

A further understanding of the nature and advantages of the present invention may be realized by reference to the remaining portions of the specification and the drawings.

DESCRIPTION OF THE PREFERRED EMBODIMENT

Figure 1:
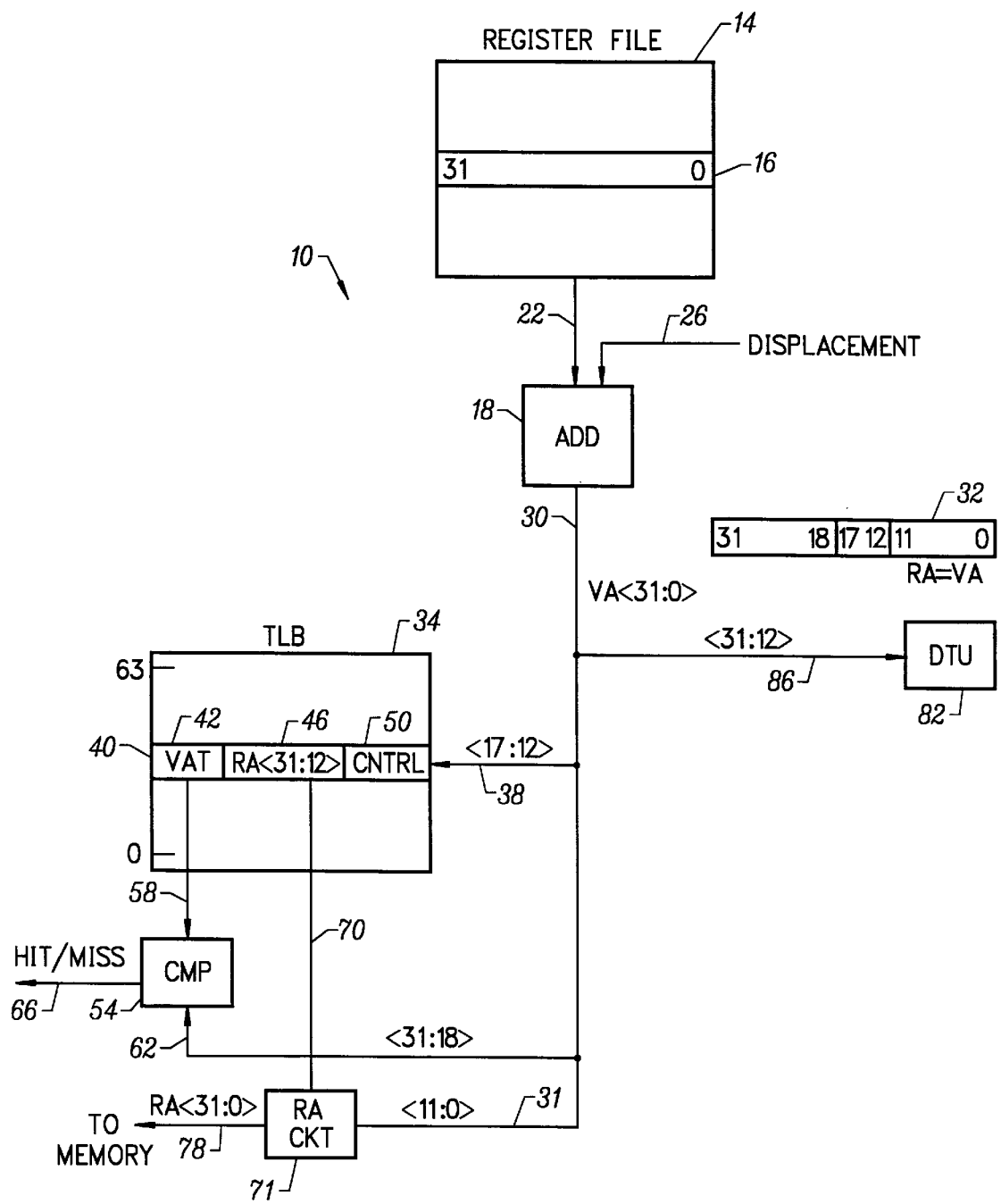
FIG. 1 is a block diagram showing a known mechanism for reading data from an addressable translation memory.
Figure 2:
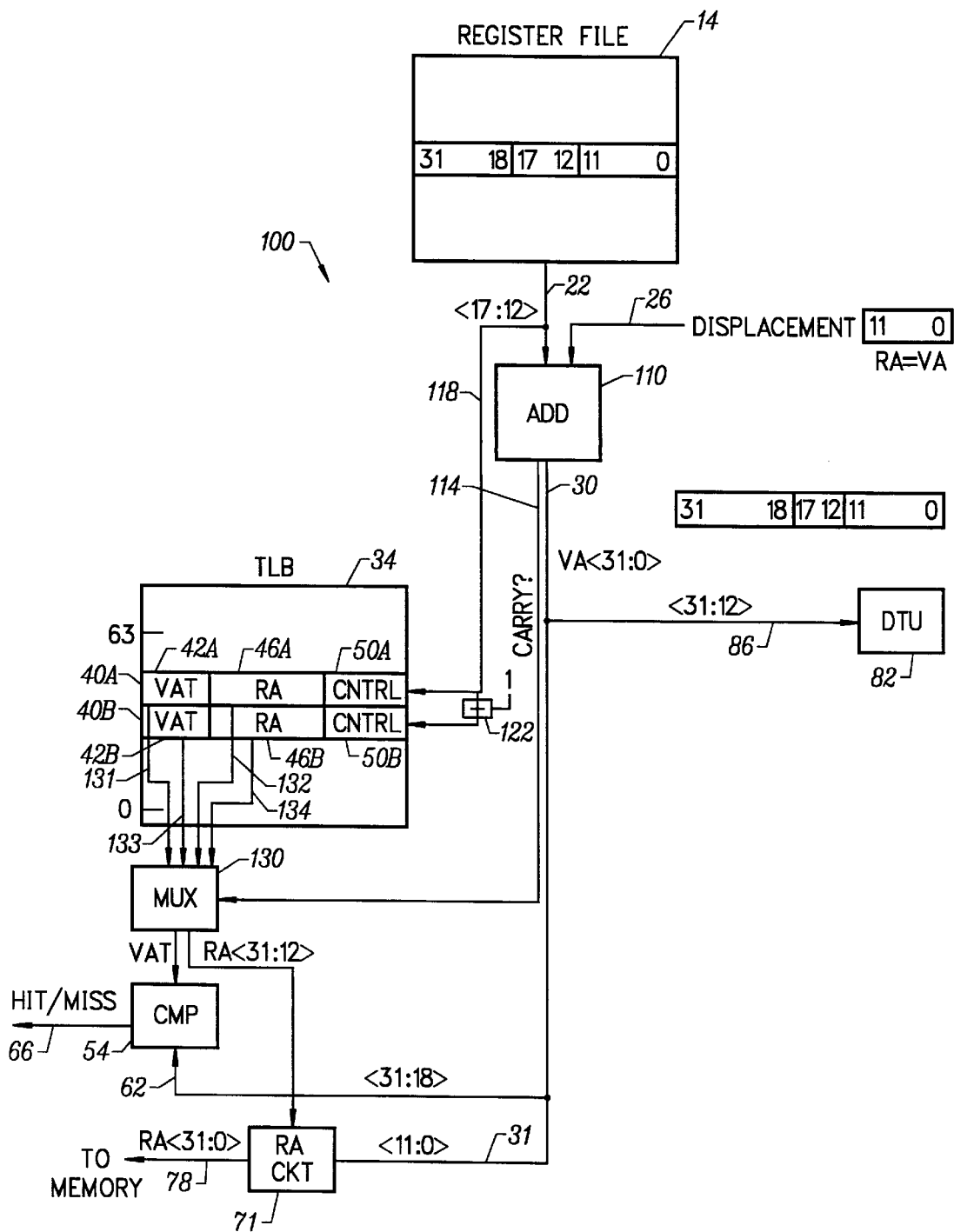
FIG. 2 is a block diagram showing one solution for reading consecutive entries from an addressable translation memory.
Figure 3:
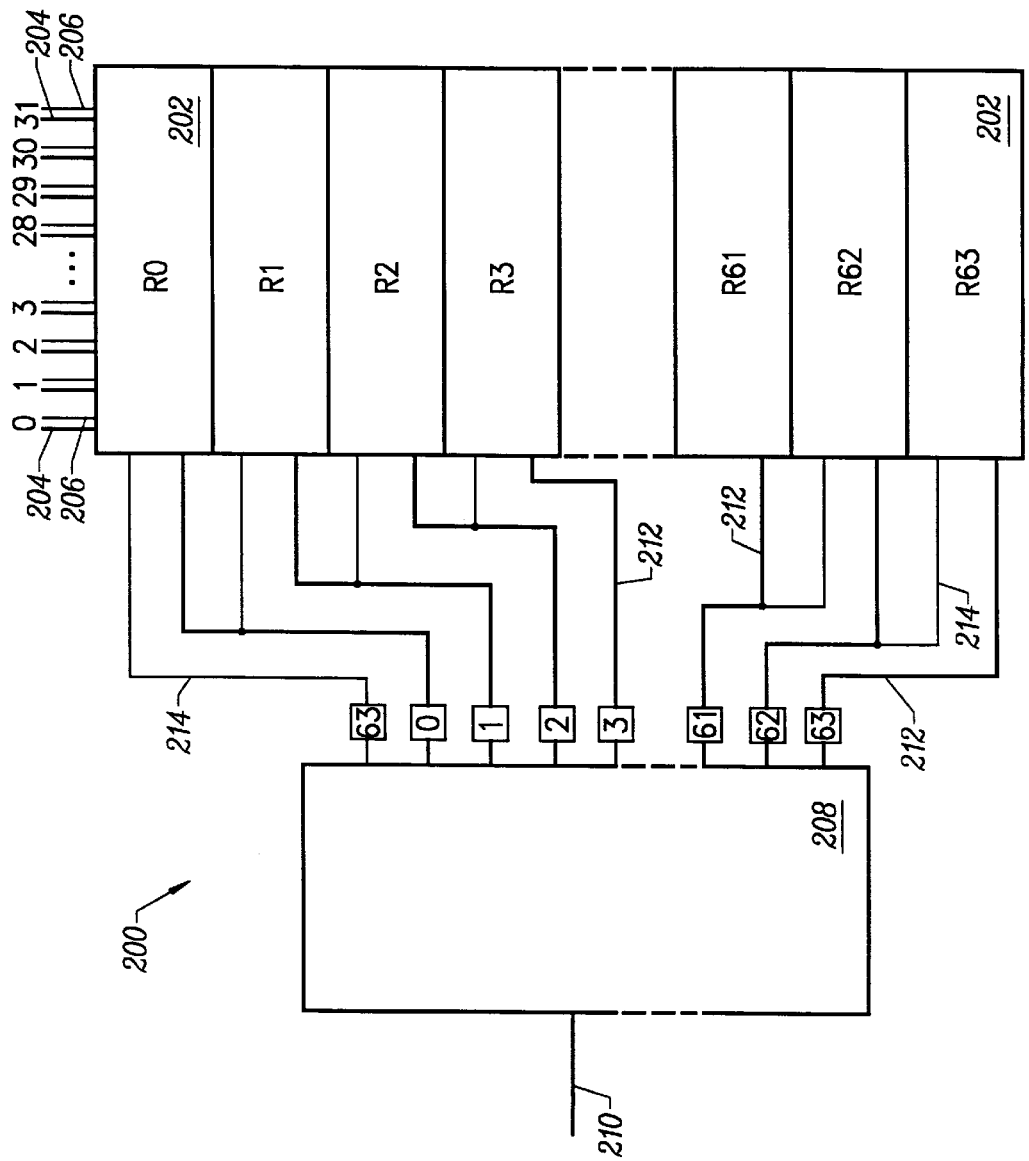
FIG. 3 is a block diagram showing a specific embodiment of the present invention.
Figure 4:
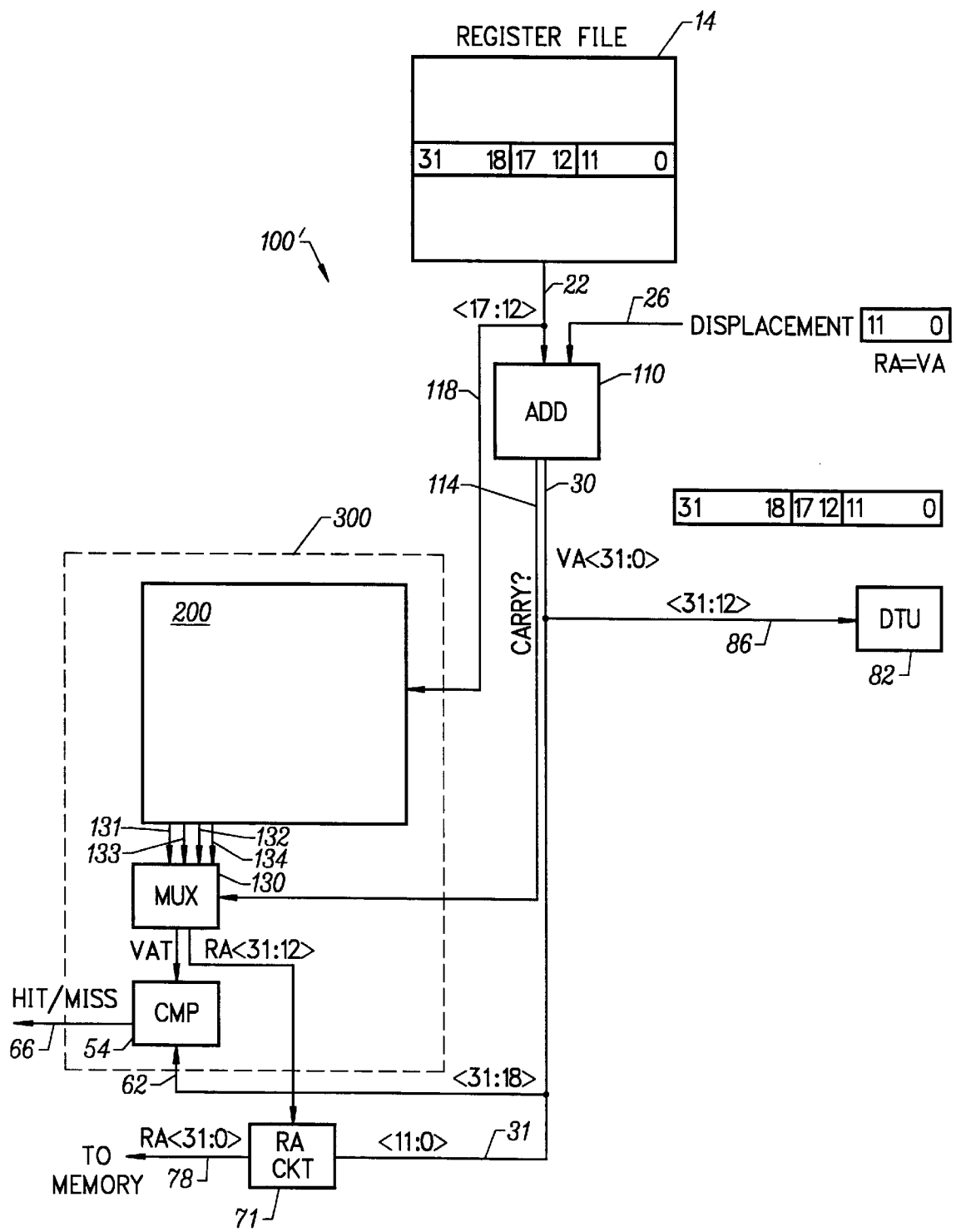
FIG. 4 is a block diagram showing another solution for reading consecutive entries from an addressable translation memory which incorporates the translation memory of FIG. 3.

FIG. 3 is a block diagram showing an addressable translation memory 200 designed according to the present invention in which consecutive entries may be accessed substantially simultaneously. Translation memory 200 may be employed in place of TLB 34 and adder 122 in system 100 described above with reference to FIG. 2. Such a system 100' is shown in FIG. 4. System 100' operates similarly to system 100 except as described below. Some of the components used in apparatus 100 of FIG. 2 are also used in apparatus 100'. The numbering for these components remains the same. It will be understood that the invention embodied by translation memory 200 may be employed in a wide variety of architectures in which access to consecutive entries is desirable, and is not limited to the embodiment shown in FIG. 4. For the purpose of the specific embodiment of the invention described herein, addressable translation memory 200 may also be referred to as translation lookaside buffer (TLB) 200. TLB 200 of system 100' is a direct mapped TLB. A multi-way set associative embodiment will be discussed with reference to FIG. 5.

According to the invention, each 32-bit register 202 in translation memory 200 is dual ported. That is, each register 202 may be accessed as either a primary or a secondary word. An entry stored in a register 202 which is selected as a primary word is output on primary bit lines 204 (heavy lines). An entry which is selected as a secondary word is output on secondary bit lines 206 (lighter lines). When translation memory 200 is employed as shown in FIG. 4, selected ones of bit lines 204 and 206 correspond to communication paths 131–134 between memory 200 and multiplexer 130. Moreover, communication paths 131–134 of FIG. 4 carry the same information to multiplexer 130 as described above with reference to FIG. 2. Thus, as with system 100 of FIG. 2, two consecutive TLB entries are presented to multiplexer 130 which, in turn will transmit one or the other depending upon the state of the carry line 114. However, unlike system 100, the two consecutive entries are presented substantially simultaneously without the delay caused by the operation of adder 122. Consecutive entries in the translation memory of the present invention are selected in the following manner.

A 6-bit address in the range 000000 to 111111 is sent to decoder 208 via communication path 210. Decoder 208 converts the address into an output select signal corresponding to one of sixty-four 32-bit registers 202. The output select signal is then transmitted to the selected register via one of sixty-four primary select lines 212 (heavy lines). Substantially simultaneously with the transmission of the primary output select signal to the selected register, a secondary output select signal is transmitted to a second register via a corresponding one of sixty-four secondary select lines 214 (lighter lines). The selection of a primary register Rn triggers the secondary selection of R(n+1). Table I illustrates the relationship between the 6-bit input address and the corresponding primary and secondary words selected.

TABLE I

| ADDRESS | PRIMARY WORD | SECONDARY WORD |
|---|---|---|
| 000000 | R0 | R1 |
| 000001 | R1 | R2 |
| 000010 | R2 | R3 |
| ... | ... | ... |
| 111101 | R61 | R62 |
| 111110 | R62 | R63 |
| 111111 | R63 | R0 |

It should be noted that the organization of translation memory 200 is "circular" in that address "111111" which selects the word stored in register R63 as the primary word, also selects the word stored in register R0 as the secondary word. It should also be noted that, in the specific embodiment of the invention shown in FIG. 3, the select line for register R63 (as denoted by the boxed numeral 63 in line with the corresponding select line) is duplicated at the top of the decoder for the secondary select line corresponding to R63 to avoid the necessity of wiring the secondary select line across the other select lines to the top of the translation memory.

Figure 5:
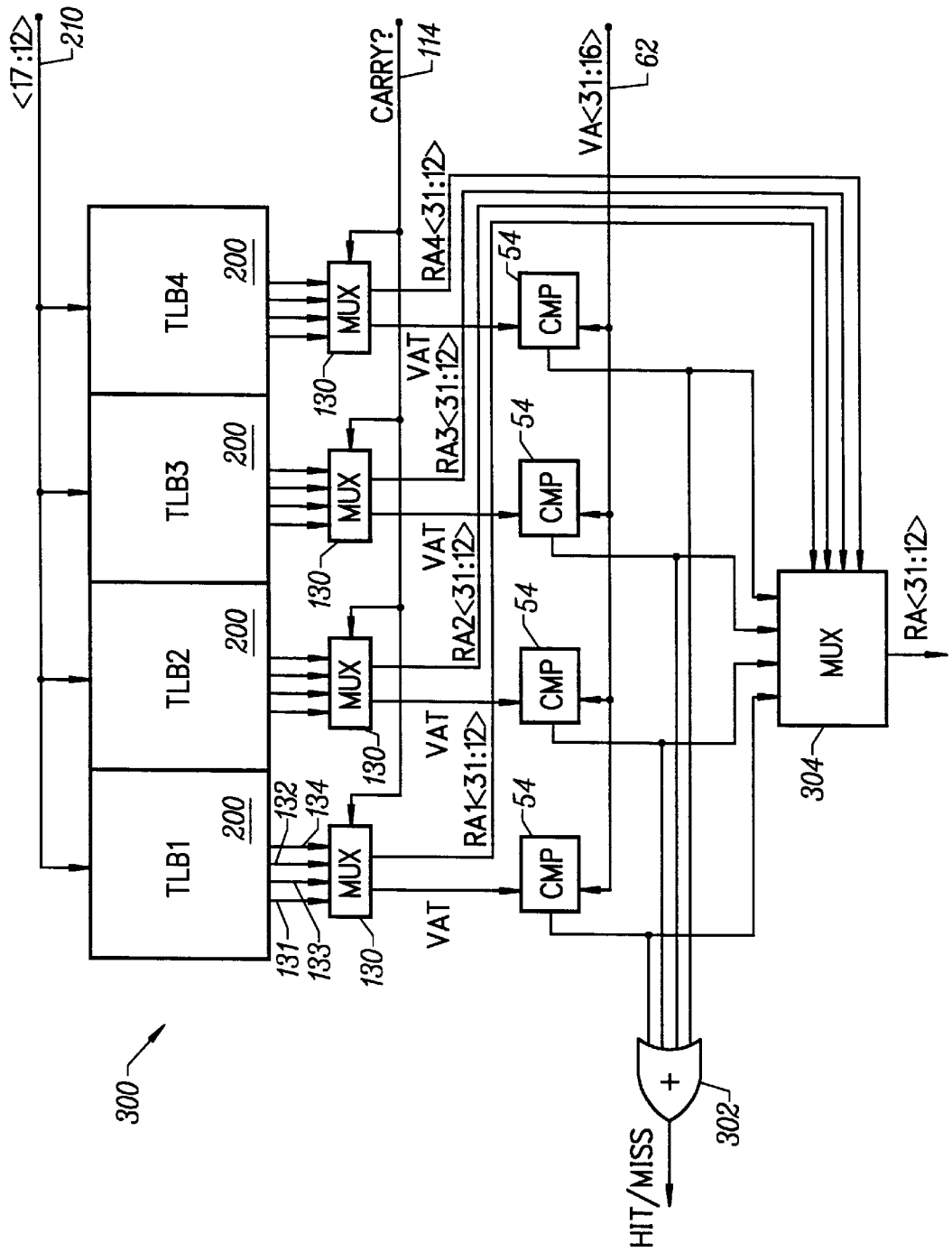
FIG. 5 is a block diagram of a four-way set associative embodiment of the present invention.

FIG. 5 is a block diagram of an embodiment of the invention employing a four-way set associative address translation memory. The block diagram of FIG. 5 is intended to be used in system 100' of FIG. 4 in place of the area enclosed in box 300 (dashed line). Instead of one translation memory 200 as shown in FIG. 4, the embodiment of the invention shown in FIG. 5 uses four (TLB1–TLB4), each of which is addressed by bits [15:12] of the base address from register file 14 as described with reference to FIGS. 2 and 4; the total TLB size (being the sum of registers in TLBs 1–4) remains the same as the TLB in FIGS. 2 and 4. TLBs 1–4 may be thought of as individual blocks of memory within a larger TLB. In response to bits [15:12], each TLB 200 transmits the virtual and real address tags for two adjacent TLB entries via communication paths 131–134 to an associated multiplexer 130. Each multiplexer 130 transmits the virtual and real address tags of one of the entries (depending upon the state of CARRY signal line 114) to a comparator 54 and a multiplexer 304, respectively. Each of comparators 54 compares the virtual address tag from the corresponding TLB to bits [31:16] of the calculated virtual address to determine whether a TLB hit has occurred. If none of the virtual address tags matches bits [31:16] of the calculated virtual address, a miss signal is generated at the output of OR-gate 302 and bits [31:12] are communicated to DTU 82 (FIG. 4) for translation to a real address.

If, on the other hand, one of the virtual tags does match bits [31:16] of the calculated virtual address, a hit signal is generated at the output of OR-gate 302 and multiplexer 304 transmits the corresponding real address field (RAn[31:12], n=1 to 4) to real address circuit 71 for formation of the 32-bit real address as discussed with reference to FIG. 4. The outputs of comparators 54 are used both as inputs to OR-gate 302 to generate the hit signal, and as select lines for multiplexer 304 to select the real address field to be transmitted. It will be understood that the embodiments of FIGS. 3–5 are merely illustrative and that there are many different ways in which the invention may be implemented. For example, the embodiment of FIG. 5 employs a four-way set associative translation memory, but may be generalized to employ an n-way or multi-way set associative translation memory.

Moreover, while the invention has been particularly shown and described with reference to these specific embodiments, it will be understood by those skilled in the art that the foregoing and other changes in the form and details may be made therein without departing from the spirit or scope of the invention. For example, the present invention should not be limited by whether the associated processor uses 32-bits, 64-bits, etc., on the width of its register file, on the length of its addresses, on the size of the page used in its physical memory, or in the number of entries in its TLB. Consequently, the scope of the invention should be determined with reference to the appended claims.

What is claimed is:

1. An apparatus for enabling access to consecutive entries in an addressable translation memory, the addressable translation memory comprising a plurality of registers configured to store the entries and configured to provide access to entries substantially simultaneously in response to output select signals, the apparatus comprising:

an address decoder configured to receive input address signals and to generate first output select signals and second output select signals in response thereto, the input address signals, the first output select signals and the second output select signals corresponding to registers from the plurality of registers;

a plurality of primary select lines coupled to the address decoder and to the addressable translation memory, configured to transmit the first output select signals to a first register of the plurality of registers; and a plurality of secondary select lines coupled to the address decoder and to the addressable translation memory, configured to transmit the second output select signals to a second register of the plurality of registers, the first register and the second register configured to store consecutive entries, the second register configured to receive the second output select signals substantially simultaneously with the first register.

2. The apparatus of claim 1 further comprising:

a plurality of primary bit lines for transmitting entries stored in the first register selected by the plurality of primary select lines; and a plurality of secondary bit lines for transmitting entries stored in the second register selected by the plurality of secondary select lines.

3. The apparatus of claim 2 wherein the addressable translation memory is multi-way set associative, the apparatus further comprising:

means for generating a hit signal when a portion of the input address signals corresponds to a portion of a first entry stored in the first register of the plurality of registers; and means for selecting and transmitting the first entry in response to the hit signal.

4. A method for accessing consecutive entries in an addressable translation memory, the addressable translation memory comprising a plurality of registers configured to store the entries, the method comprising:

receiving an input address signal;

generating an output select signal in response to the input address signal, the input address signal and the output select signal corresponding to a first register of the plurality of registers;

transmitting the output select signal to the first register; and transmitting the output select signal to a second register of the plurality of registers, the first register and the second register storing consecutive entries, the second register receiving the output select signal substantially simultaneously with the first register.

5. The method of claim 4 further comprising the steps of:

transmitting an entry stored in the first register by means of a plurality of primary bit lines; and transmitting an entry stored in the second register by means of a plurality of secondary bit lines.

6. An addressable translation memory, comprising:

a plurality of registers configured to store translation lookaside buffer entries;

an address decoder configured to receive input address signals and to substantially simultaneously generate a first set of output select signals and a second set of output select signals in response thereto, the first set of output select signals and the second set of output select signals corresponding to adjacent registers of the plurality of registers;

a plurality of primary select lines, coupled to the address decoder configured to transmit the first set of output select signals to a first register of the plurality of registers; and a plurality of secondary select lines, coupled to the address decoder configured to transmit the second set of output select signals to a second register of the plurality of registers.

7. The memory of claim 6 further comprising:

a plurality of primary bit lines for transmitting an entry stored in the first registers selected by the plurality of primary select lines; and a plurality of secondary bit lines for transmitting an entry stored in second registers selected by the plurality of secondary select lines.

8. The memory of claim 6 wherein the plurality of registers comprise 64 registers.

9. The memory of claim 6 wherein the addressable translation memory is multi-way set associative.

10. An apparatus for enabling access to consecutive entries in a multi-way set associative translation memory, comprising:

the multi-way set associative translation memory being configured in a plurality of blocks of memory, comprising:

a plurality of registers configured to store entries;

an address decoder configured to receive input address signals and to substantially simultaneously generate output select signals in response thereto;

a plurality of primary select lines coupled to the address decoder, each primary select line configured to transmit a first plurality of output select signals from the output select signals to a first register of the plurality of registers;

a plurality of secondary select lines coupled to the address decoder, each secondary select line configured to transmit a second plurality of output select signals from the output select signals to a second register of the plurality of registers, the first register and the second register configured to store consecutive entries;

a plurality of primary bit lines configured to transmit a first entry stored in the first register selected by the primary select lines; and a plurality of secondary bit lines configured to transmit a second entry stored in the second register selected by the secondary select lines;

hit signal generation circuitry configured to compare a first portion of an input address signal to a first portion of the first entry stored in first register;

selection circuitry configured to select a second portion of the first entry when the first portion of the input address signal corresponds to the first portion of the first entry; and transmission circuitry configured to transmit at the second portion of the first entry.

* * * * *